Oct. 19, 1965  A. R. BRAULT  3,212,194
AUTOMATED WORK LAYOUT MEANS
Filed Nov. 19, 1962  3 Sheets-Sheet 1

INVENTOR.
ANDRE R. BRAULT
BY
*James P. Malone*

Oct. 19, 1965  A. R. BRAULT  3,212,194
AUTOMATED WORK LAYOUT MEANS
Filed Nov. 19, 1962  3 Sheets-Sheet 2

INVENTOR.
ANDRE R. BRAULT
BY James P. Malone

Oct. 19, 1965 A. R. BRAULT 3,212,194
AUTOMATED WORK LAYOUT MEANS
Filed Nov. 19, 1962 3 Sheets-Sheet 3
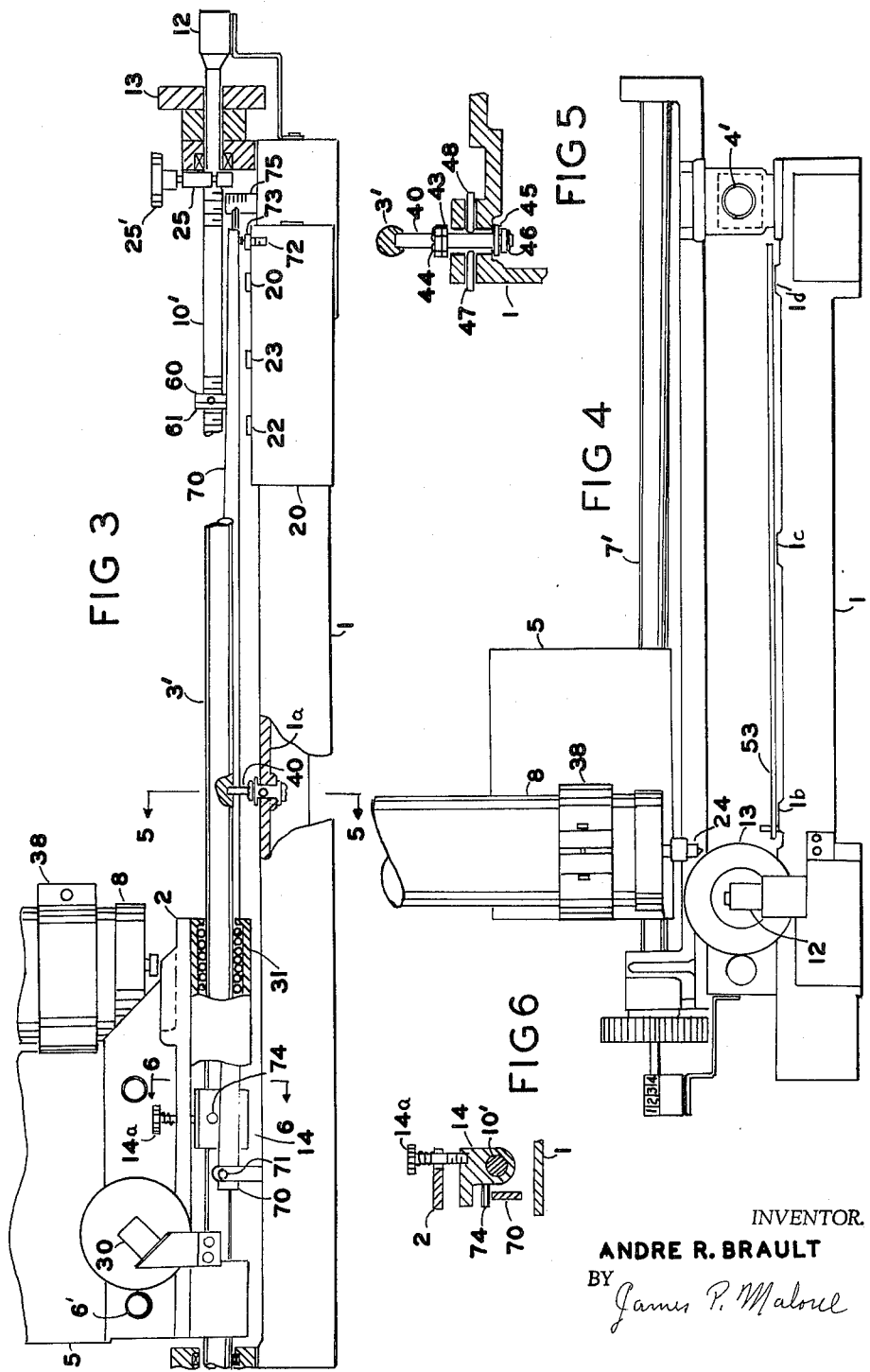
INVENTOR.
ANDRE R. BRAULT
BY James P. Malone

United States Patent Office 3,212,194
Patented Oct. 19, 1965

3,212,194
AUTOMATED WORK LAYOUT MEANS
Andre R. Brault, North Merrick, N.Y., assignor to OPTOmechanisms, Inc., Plainview, N.Y.
Filed Nov. 19, 1962, Ser. No. 238,509
1 Claim. (Cl. 33—189)

This invention relates to automated means for locating or laying out holes, cutting marks or other indicia on a workpiece, or in checking or inspecting such marks, holes, or indicia.

In the machinist's art it is evry difficult, tedious and time consuming to accurately locate or lay out holes, cutting lines or other marks on a workpiece, for instance on dies, molds, templates or other accurately machined pieces. These marks are generally located with a machinist scale, T square, height gauge, or calipers and are subject to human error in reading the scales and positioning scales. When such lines or marks are made it is then customary for the craftsman to manually center-punch a starting point for the drilling tool at the intersection of the scribed lines. This procedure of necessity degrades the accuracy of location because it is a manual operation. Furthermore, after this center-punch mark is made it is extremely difficult to make the holes accurately because of all the further manual steps involved. Furthermore, such errors may have a cumulative effect. Also in respect to the accuracy herein discussed, a temperature variation during the time of laying out of the marks will also affect the accuracy.

The present invention solves these difficulties by providing very accurate means for locating or laying out such holes or marks in one operation. The present invention minimizes the human error in reading, by providing a digital type indicator and also provides temperature compensation with calibrated cams. The cams may also compensate for inaccuracies in the indexing mechanism itself.

The present invention generally comprises a work table, a platform or carriage slidably mounted along one axis of the table and adapted to be indexed by means of a motor driven lead screw laid along said axis. A digital counter is mounted on platform which is geared to the lead screw for direct reading.

On the first carriage is a second carriage slidably mounted and similarly motor driven along an axis perpendicular to the first axis, also with a digital indicator. On the second platform is mounted a small motorized depressable drill for making holes, or marks. Alternatively a scribe or other indicating means may be attached thereto. Suitable means for locking the drill are provided.

Accordingly a principal object of the invention is to provide new and improved means for laying out or locating holes or other indicia on a workpiece.

Another object of the invention is to provide new and improved motorized means for laying out or locating holes or other indicia on a workpiece with digital reading means.

Another object of the invention is to provide new and improved motorized means for laying out or locating holes or other indicia on a workpiece with temperature compensation.

Another object of the invention is to provide new and improved layout means for machine work having high accuracy and minimum possibility of error.

Another object of the invention is to provide new and improved motorized layout means for machine work having direct reading and temperature compensation.

Another object of the invention is to provide new and improved means for laying out machine work comprising a work table, a platform slidably mounted along two perpendicular axes over said work table, motor means to index said platform, digital reading means connected to said platform, the index of said digital reading means being compensated for temperature and mechanical errors.

These and other objetcs of the invention will be apparent from the following specification and drawings of which, FIGURE 1 is a perspective view of an embodiment of the invention.

FIGURE 3 is a side view of the embodiment of FIGURE 2.

FIGURE 4 is an end view of the embodiment of FIGURE 2.

FIGURE 5 is a detail sectional view taken along the line 5—5 of FIGURE 3.

FIGURE 6 is a detail sectional view taken along the line 6—6 of FIGURE 3.

Figure 1:
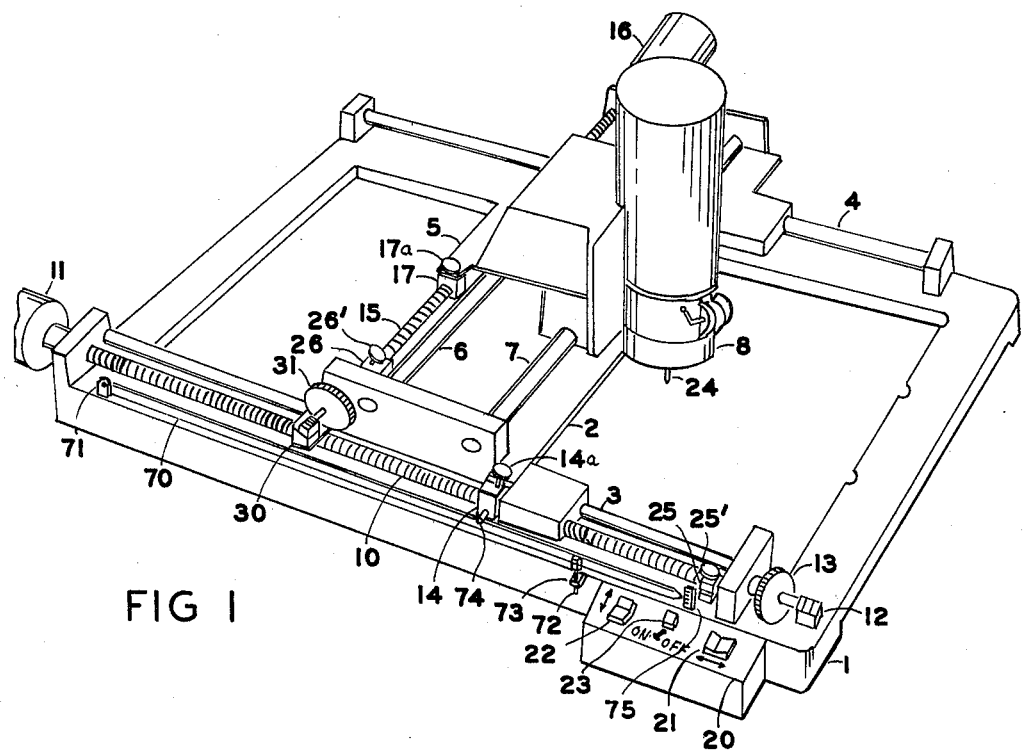

Referring to the figures the invention generally comprises a work table 1, which may be a cast steel or aluminum frame having suitable mounting holes or clamps for mounting the work piece or work pieces. A first carriage 2 is slidably mounted on a pair of stainless steel rods 3 and 4 for movement along one axis of the work frame or table. The carriage is mounted on rods with suitable ball bearing bushings.

A second carriage 5 is mounted on the first carriage by means of stainless steel rods 6 and 7, mounted on the first carriage in a direction at angle of 90° to the direction of movement to the first carriage. The carriage 5 is mounted on the rods 6 and 7 by means of ball bearing bushings similarly to the carriage 5. The drill head 8 is of the type conventionally available having vertical adjustments and which is electrically operated to depress the cutting bit 24, upon the operation of a control switch 23, as will be explained.

The first carriage 2 is adapted to be moved along and indexed by means of lead screw 10, which is rotatably mounted on frame 1. The lead screw 10 is adapted to be driven by the motor 11, which is connected to frame 1. Connected to the other end of lead screw 10 is a digital counter 12 and manual knob 13. The digital counter 12 is direct reading in thousands of an inch. The carriage 2 is connected to the lead screw 10 by means of the nut 14, which is removably connected to the carriage and which rides on the lead screw 10. The nut 14 is connected through a slot in the carriage with a quick disconnect clamp 14a so that the nut may be easily disengaged from the carriage, if it is desired to utilize movement of the carriage without the lead screw.

The second carriage 5 is adapted to be indexed by means of the lead screw 15, which is rotatably mounted in suitable bearings on the carriage 2. The lead screw 15 is adapted to be driven by the motor 16, which is mounted on the carriage 2. The carriage 5 is connected to the lead screw by means of the nut 17 and clamp 17a. Digital counter 30 and manual knob 31 are mounted on lead screw 15.

A control panel 20 is provided having an on-off switch and three reversible switches. Swith 21 is connected to operate the motor 11 and move the carriage 2 in either direction along one axis of the work table and switch 22 is connected to the motor 16 to move the drill head along the other axis. The switch 23 is connected to operate the drill head 8, which comprises an electrically driven drill bit 24, which is mounted to move down into contact with the workpiece by means of pneumatic or air pressure. The drill head 8 may be a conventional commercially available device such as manufactured by the Dumore Corporation.

A temperature compensating cam 70 is pivotally mounted on the base 1 by means of the pin 71. The angle of the cam is adjusted by means of the adjusting screw 72 which is threaded into base 1. The adjusting screw 72 is locked by means of the nut 73.

The nut 14, which rides on the lead screw 10' has a spring loaded removable follower pin 74 which rides on the top surface of cam 70. Therefore, the tilt of the nut 14 may be adjusted by means of the long cam 70 and as this rotation is made the carriage is advanced or retarded proportionally; for instance, as the pitch of thread of the nut 14 is equal to .1 inch a typical correction would be .001 inch or 3.6° of rotation. This arrangement provides sufficiently for any normal temperature variation. The cam may be cut and calibrated against the scale 75 for various temperature conditions. A similar cam may be mounted on the shorter axis if desired.

Figure 2:
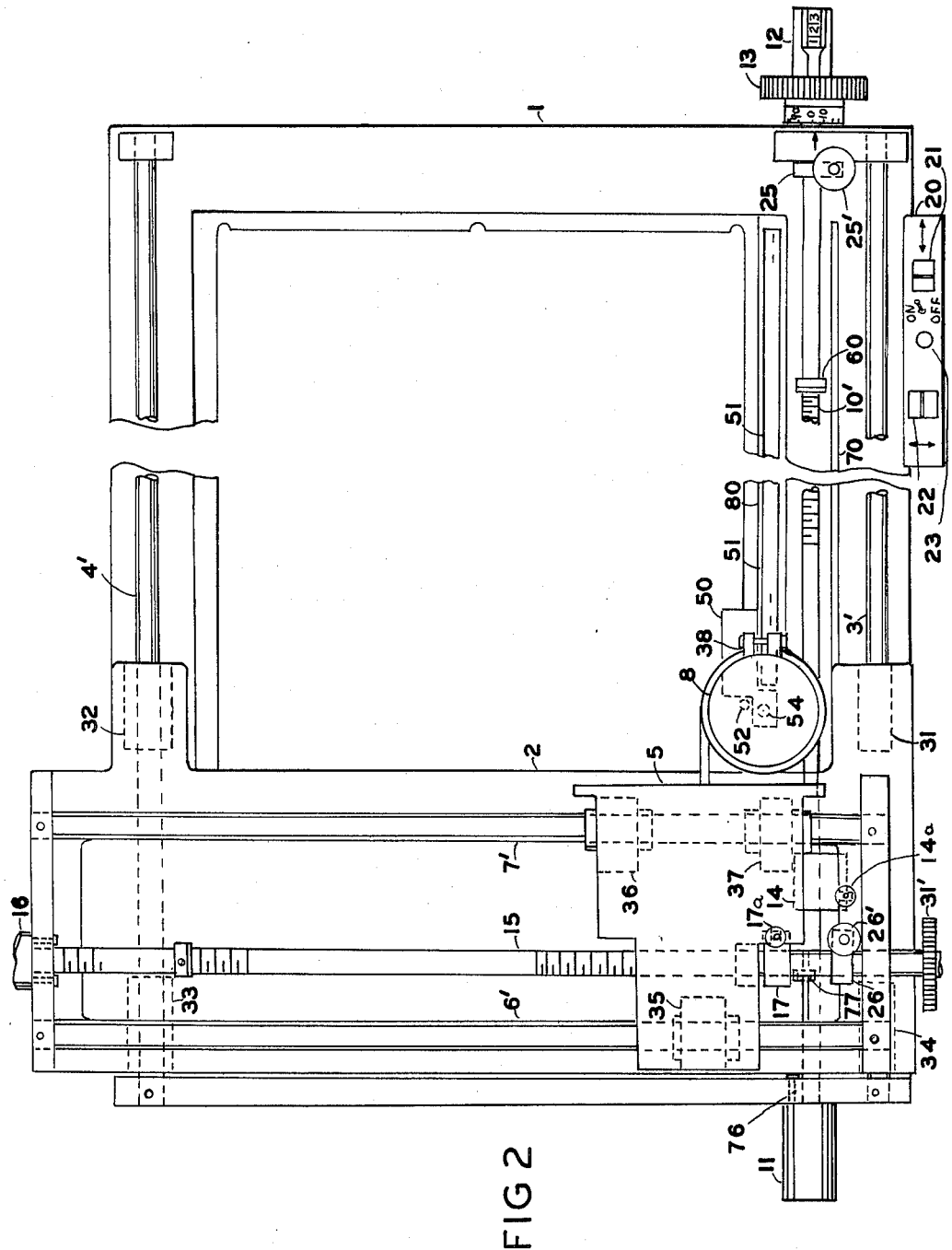
FIGURE 2 is a plan view of an embodiment of the invention.

FIGURE 2 is a plan view of an embodiment of the invention. It differs from FIGURE 1 only in that position of the lead screw and adjacent ways are reversed.

The carriage 2 is mounted on the ways 3' and 4' with suitable ball bearings 31, 32, 33, and 34.

The carriage 5 is mounted on ways 6' and 7' by means of ball bearings 35, 36, and 37, mounted in carriage 2.

The drill head 8 is connected to the carriage 5 by means of clamp bracket 38 and it is connected to a source of power in the control switch 23, by suitable wires not shown.

Adjustable stop pin 76 is mounted on the base 1 for the purpose of adjustably stopping the carriage 2 in zero reference position. Adjustable pin 77 is mounted on the carriage 2 for adjustably stopping the carriage 5 in zero position.

A bank rail 51 is adjustably mounted on the base 1, for accurately locating the work plate 53. A dirt groove 80 is preferably provided in front of the bank rail to collect any dirt or chips so that the work sheet will rest evenly against the bank rail.

FIG. 3 is a side view of the embodiment of FIG. 2, illustrating a typical construction for the bearing 31. Also shown in FIG. 3 and FIG. 5 are means for maintaining the straightness of the ways. These means comprise one or more spaced threaded pins 40, which are connected to ways 3'. The pin 40 extends through the upper panel of the base 1.

Referring also to FIG. 5, which is an enlarged view, the pin 40 is connected to the rod 3 and 4 at its upper end and extends through the base panel 1. A washer 43 and nut 44, connect the pin at the upper end of the base 1 and a washer 45, and nut 46, clamp the pin on the lower side of the base 1c. By adjusting the nuts 44 and 46 the rod 3 may be raised or lowered.

Side motion of the rod is provided by means of the set screws 47 and 48, which are threaded into corresponding threaded shaftways in the base casting 1.

A stop collar 60 is mounted on the lead screw 10' in order to stop the carriage 2. The collar 60 has a rubber bumper 61, and is secured to the lead screw with a set screw.

FIG. 4 shows a side view of the embodiment of FIG. 3, illustrating the mounting of carriage 5 upon the ways 6' and 7' and also showing the clamp 38 for holding in the drill head 8.

FIG. 4 also shows a work supporting plate 53, which is mounted on raised portion 1b, 1c, 1d, of the base 1.

The work plate 53 may be removably mounted on the base 1 by conventional clamps or screws. The vertical movement of the drill head 8 is adjustable for individual work pieces which may be stacked one on top of each other and holes drilled through the entire assembly simultaneously.

FIG. 6 is a sectional view illustrating the construction of the nut 14, which rides along the lead screw 10'. Temperature compensating cam 70 is pivotally mounted on the base 1, and the pin 74 cam on the nut 14 rides along the top of the cam. The nut 14 is secured to the carriage 2 by means of the clamp 14a which engages a slot on the base of the carriage 2. The clamp 14a is preferably spring loaded in order to cause the pin 74 to bear against the cam 70.

The zero setting is made as follows:

An aligning block 50, FIG. 2, is placed against the bank member 51, and the aligning pin 52, mounted on base 1. The block 50 has a shaftway 54, which will be approximately located under the drill head 8 when the drill press is in the zero position. A dial indicator is connected to the chuck of the drill head. The indicator has a finger which extends down through aperture 54. As the drill head is rotated the bank member 51 and stop pins 77 and 76, are adjusted until there is no deflection on the indicator dial indicating thereby that the drill head is centered over the aperture 54. The bank member 51, and the stop pins 77 and 76, are then locked. The counters 12 and 30, are then set on zero and locked to their shafts by means of set screws.

The base 1 is preferably a heavy wall aluminum ribbed stabilized casting and in one embodiment it was 3 inches high, 32 inches wide and 45 inches long.

The ways for the carriages are precision ground steel rods. The carriages ride on precision ball bearing bushings, thereby keeping friction to minimum. The lead screws are hardened and precision ground and accurate to .0005 inch per foot and are mounted in duplex ball bearings lubricted for the life of the bearing. The motors 11 and 16, are high speed instantly reversible motors which are commercially available. They preferably have a clutch connection to the lead screws.

If it so desired to clamp the carriage in a certain position this may be done by means of clamps 25, and 26, which may comprise split blocks which are adapted to grip the lead screw upon a very short turning of the handle 25' and 26'. The measurements are read directly to the nearest one tenth inch on the counters and the lead screw may be then set manually by means of the knobs 13 and the corresponding knob on the lead screw 15 to the nearest .001 inch. The knobs 13 and 31' are three inches in diameter and graduated to .001 inch.

*Operation*.—To operate, depress either button switch 21 or 22 in direction of hole to be located. Read numerical indicators to nearest lower tenth of an inch, for example 2.700. Move lead screw with large handwheels to desired reading on dial, example 2.715. Push drilling switch 23.

Therefore, the present invention comprises a drilling machine with automated precision measuring capabilities. The machine is used as a rapid, accurate locating device for layout or drilling purposes.

One embodiment is designed to drill or spot holes over an area 18" wide by 24" long or up to 18" wide in sheet length. Because of its open construction it can be placed over large sheets of material of extended length and width to drill within the above dimensions.

Figure 7:
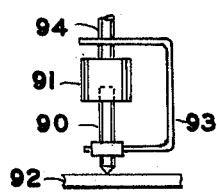
FIGURE 7 is a side view of a scribing attachment.

FIGURE 7 shows scribing means for scribing lines on the work piece, comprising a sharp pointed scriber 90, which is slidably mounted on a holder 91 and which is pressed down onto the work piece 92 by means of the spring 93. The holder is mounted in the drill chuck by means of the shaft 94. When it is desired to use the scriber, the vertical adjustment of the drill head is manually set. The carriages are moved along the lines to be scribed whereby the sharp pointed member will cut scribe lines on the work piece.

The machine can drill single pieces, stacks, masters, templates, short runs, resistor boards, printed circuit boards and relay panels. The range of materials it will work includes aluminum, brass, steel, plastics, pressed board or any ordinarily machinable ferrous or non-ferrous materials.

The unit is completely self-contained and the only installation required is to plug it into any convenient 115 volt wall outlet. Overall space requirements are 48" x 42", and it can be placed on any work bench or table. Weight is approximately 150 pounds.

Silent gearless motors drive ball bearing mounted lead screws, accurate to .0005 per ft. or .001 total length of measurement, for locating the drill head in two coordinate positions.

A push button control acuates the carriage movement in each axis and the drilling cycle. Location of measurement is read on a numerical counter to the nearest .1 in. and the fine reading is set to .001 in. on a large dial. As many as four drill heads can be mounted to drill multiple pieces. Chuck size is for #60 to 3/16" diameter. Motor speed range is automatically variable and the stroke is adjustable within .005 from 0 to 1⅛ in.

A tracer arm with push button control for locating from a master plate or drawings may be added if desired. The machine can also be easily adapted for tape-controlled operation.

I claim:

Means for accurately laying out indicia on a work piece comprising:

a work table, marking means slidably mounted on said work table, means to index said marking means along said work table comprising a lead screw rotatably mounted on said table, and a nut removably connected to said marking means, a digital indicator connected to said lead screw, a motor connected to said screw, and temperature compensation means comprising a long cam, and a pin on said nut riding on said cam.

References Cited by the Examiner

UNITED STATES PATENTS

| | | | |
|---|---|---|---|
| 1,370,645 | 3/21 | Hawkes | 33—189 |
| 1,615,668 | 1/27 | Anderson | 33—189 |
| 2,353,726 | 7/44 | Guttmann | 33—189 |
| 2,448,473 | 8/48 | Shewsbury | 33—125 |
| 2,479,293 | 8/49 | Bayless. | |
| 2,995,826 | 8/61 | Brault | 33—189 |

WILLIAM W. DYER, JR., *Primary Examiner.*

JOHN C. CHRISTIE, *Examiner.*